(12) United States Patent
Xu

(10) Patent No.: US 10,589,244 B1
(45) Date of Patent: Mar. 17, 2020

(54) HYDROPROCESSING REACTOR INTERNALS HAVING REDUCED HEIGHT

(71) Applicant: UOP LLC, Des Plaines, IL (US)

(72) Inventor: Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/270,047

(22) Filed: Feb. 7, 2019

(51) Int. Cl.
| | |
|---|---|
| *B01J 8/04* | (2006.01) |
| *B01J 8/00* | (2006.01) |
| *C10G 47/30* | (2006.01) |
| *C10G 45/00* | (2006.01) |

(52) U.S. Cl.
CPC ............ *B01J 8/0492* (2013.01); *B01J 8/001* (2013.01); *B01J 8/0453* (2013.01); *C10G 45/00* (2013.01); *C10G 47/30* (2013.01); *B01J 2208/00008* (2013.01); *B01J 2208/00849* (2013.01); *B01J 2208/00938* (2013.01)

(58) Field of Classification Search
CPC ...... B01J 8/0492; B01J 8/0496; B01J 8/0453; B01J 8/001; B01J 2208/00849; B01J 2208/00938
See application file for complete search history.

(56) References Cited

U.S. PATENT DOCUMENTS

| | | | |
|---|---|---|---|
| 5,635,145 A | 6/1997 | Den Hartog et al. | |
| 5,837,208 A | 11/1998 | Grott et al. | |
| 5,935,413 A | 8/1999 | Boyd et al. | |
| 6,183,702 B1 | 2/2001 | Nguyen et al. | |
| 6,984,365 B2 | 1/2006 | Nelson et al. | |
| 7,074,372 B2 * | 7/2006 | Muldowney | B01J 8/0453 422/220 |
| 7,078,002 B2 | 7/2006 | Van Vliet et al. | |
| 7,112,312 B2 | 9/2006 | Chou | |
| 7,601,310 B2 | 10/2009 | Breivik et al. | |
| 8,017,095 B2 | 9/2011 | Kemoun et al. | |
| 8,181,942 B2 | 5/2012 | Sechrist | |
| 8,673,246 B2 | 3/2014 | Chen et al. | |
| 9,079,141 B2 | 7/2015 | Boyak et al. | |
| 9,211,516 B2 | 12/2015 | Lesniak et al. | |
| 9,295,959 B2 | 3/2016 | Xu et al. | |
| 9,321,022 B2 | 4/2016 | Xu | |
| 9,321,023 B2 * | 4/2016 | Xu | B01J 8/0492 |
| 9,566,559 B2 | 2/2017 | Xu et al. | |
| 9,757,703 B2 | 9/2017 | Zahirovic et al. | |

(Continued)

FOREIGN PATENT DOCUMENTS

| | | |
|---|---|---|
| CA | 2887392 A1 | 4/2014 |
| CN | 107405591 A | 11/2017 |

(Continued)

*Primary Examiner* — Lessanework Seifu

(57) ABSTRACT

The hydroprocessing reactor internals (HRI) have reduced height compared to standard HRI designs. In this design, HRI height reduction is achieved by placing a mixing chamber above the collection tray. A ring quench distributor is located around the fluid collection tray between the mixing chamber and reactor shell to eliminate the vertical space occupied by the distributor. The hydroprocessing reactor quench zone internals comprise a collection tray, a mixing chamber, a ring distributor, a rough liquid distribution tray, and a vapor-liquid distribution tray. Fluid mixing occurs in the mixing chamber and above the rough liquid distribution tray.

20 Claims, 5 Drawing Sheets

(56) References Cited

U.S. PATENT DOCUMENTS

| | | |
|---|---|---|
| 9,764,299 B2 | 9/2017 | Beard et al. |
| 2011/0123410 A1 | 5/2011 | Augier et al. |
| 2014/0144121 A1 | 5/2014 | Legare et al. |
| 2014/0231308 A1 | 8/2014 | Muller |
| 2015/0071834 A1 | 3/2015 | Korsten et al. |
| 2016/0186075 A1* | 6/2016 | Treese .................. C10G 65/12 585/350 |
| 2017/0173547 A1 | 6/2017 | Maas et al. |
| 2018/0057757 A1 | 3/2018 | Song et al. |

FOREIGN PATENT DOCUMENTS

| | | |
|---|---|---|
| WO | 2014056935 A1 | 4/2014 |
| WO | 2016155938 A1 | 10/2016 |

\* cited by examiner

US 10,589,244 B1

HYDROPROCESSING REACTOR INTERNALS HAVING REDUCED HEIGHT

BACKGROUND

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, a vapor, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor temperature and composition distribution at top of a catalyst bed can persist or grow as the process fluids move down the reactor. Hot spots can develop and cause rapid deactivation of the catalyst and shorten the reactor operation cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

There is always a desire for minimizing the space between reactor beds for introducing a quench fluid and mixing the vapor and liquid along with the quench fluid. Particularly, for existing hydroprocessing reactors, it is often desired to reduce the space between catalyst beds for increasing catalyst loading so that the reactor throughput or operating cycle time or both can be increased. Even for new reactors, it is often desired to reduce the overall size of the reactors to reduce capital expenditure and the profile of the reactor in a processing plant. Therefore, it is desirable to provide for good mixing and distribution of fluids between adjacent catalyst beds in a relatively short interbed space.

The design of reactors to overcome these limitations can save significantly on the valuable space within a reactor for maximizing catalyst loading. Further, it is often desirable to revamp existing reactors to improve processes with the same or reduced quench zone space between catalyst beds. New reactor internals that improve the utilization of the space within a reactor shell can provide significant cost savings, and allow for revamps of existing reactors to meet new operational and regulatory requirements.

DESCRIPTION OF THE INVENTION

Figure 1:
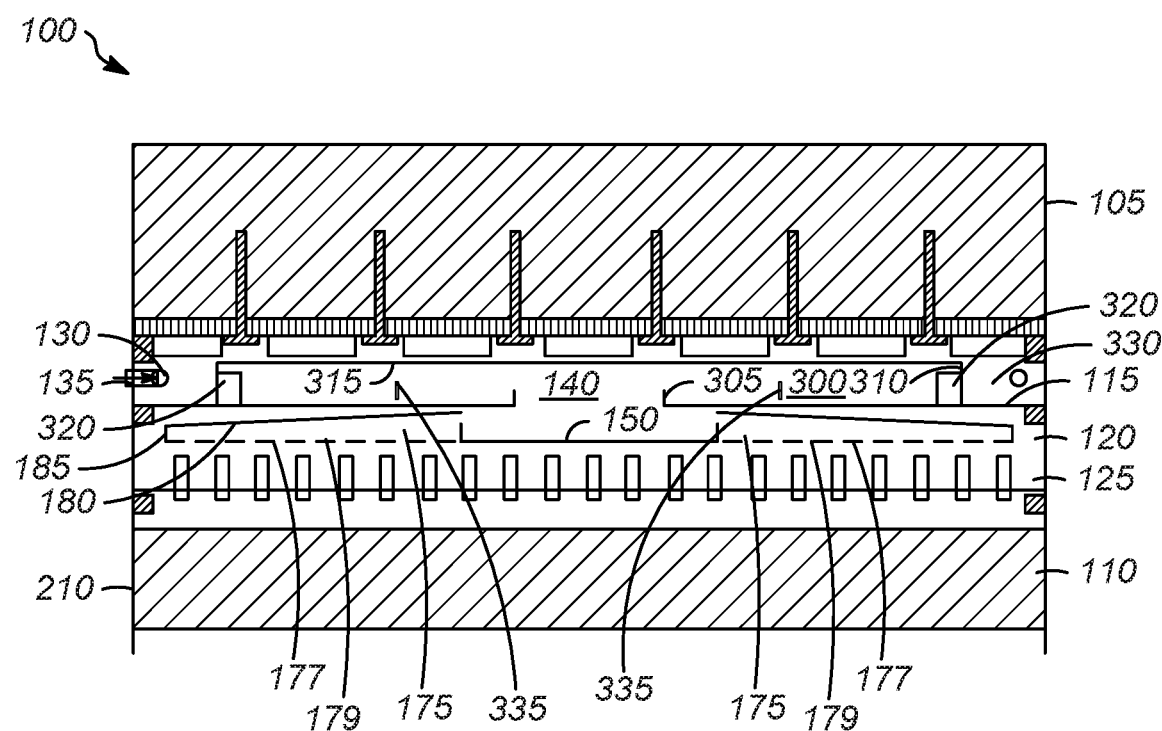
FIG. 1 is a cross section of one embodiment of the hydroprocessing reactor internals of the present invention.

Minimizing hydroprocessing reactor internals (HRI) height and maximizing catalyst loading in revamp of existing reactors helps to increase production rate and/or operation cycle length which improves the economics of the process. In this design, HRI height reduction is achieved by placing a mixing chamber above the collection tray. A ring quench distributor is located around the fluid collection tray between the mixing chamber and the reactor shell to eliminate the vertical space occupied by the distributor. Fluid enters the mixing chamber tangentially through openings in the side of the mixing chamber with directional baffles to eliminate the vertical space occupied by spillways in conventional design where the spillways are placed on top of the mixing chamber.

The mixing chamber has a central opening for fluid to flow out. In some embodiments, both liquid and vapor flow through the central opening. In other embodiments, the mixing chamber outlet has a central opening mainly for liquid flow and vapor chimneys around the central opening mainly for vapor flow. By reversing the order of vapor and liquid flow out of the mixing chamber, the vapor will not pass through a liquid curtain below the outlet as in the current design. In this way, the vapor and liquid are mostly separated before they reach the rough liquid distribution tray. As a result, the liquid flow onto the rough liquid distribution tray is less turbulent, and the liquid flow above the rough liquid distribution tray has less of a tendency of sloshing. Consequently, the height of the banding plate around the rough liquid distribution tray can be reduced, as well as the space above the tray. In some embodiments, the top of the vapor chimneys is sloped towards the central opening to minimize liquid entrainment and to improve vapor-liquid segregation in case liquid enters into the vapor chimneys. In yet another embodiment, the mixing chamber outlet has a central opening mainly for vapor flow and liquid downcomers around the central opening mainly for liquid flow. The liquid downcomers extend from the bottom plate of the mixing chamber down to above the rough liquid distribution tray. Vapor out of the central opening passes through the space between the liquid downcomers and flows radially outward on the rough liquid distribution tray to reduce flow turbulence and space above the rough liquid distribution tray.

The rough liquid distribution tray has a central pan for receiving vapor and liquid out of the mixing chamber. In one embodiment as shown in U.S. Pat. No. 5,837,208, the tray has perforations on the floor outside the central pan for liquid flow into a vapor-liquid distribution tray below and an annular opening zone between the outer edge of the tray and reactor shell for vapor flow into the vapor-liquid distribution tray. In another embodiment as shown in U.S. Pat. No. 9,295,959, the rough liquid distribution tray may have pie-shape chimneys extending from the central pan to the outer edge of the tray for vapor bypassing into the vapor-liquid distribution tray so that the required space between rough liquid distribution tray and the vapor-liquid distribution tray is reduced. In yet another embodiment, the rough liquid distribution tray includes multiple fluid distribution troughs attached to the central pan that extended radially outwards with the outer end close to the reactor shell. The fluid distribution trough bottom has holes for liquid flow to the vapor-liquid distribution tray below. The fluid distribution trough has side walls sloped from the central pan to the fluid distribution trough outer end and an end wall for retaining liquid within the fluid distribution trough for liquid distribution. Vapor and liquid flow horizontally from the central pan to the distribution troughs. Vapor leaves the fluid distribution trough from top of the walls and flows down to the vapor-liquid distribution tray through the open spaces between the fluid distribution troughs and between the fluid distribution troughs and the reactor shell.

The hydroprocessing reactor quench zone internals comprise a collection tray, a mixing chamber, a ring distributor, a rough liquid distribution tray, and a vapor-liquid distribution tray. Fluid mixing occurs mainly in the mixing chamber and above the rough liquid distribution tray.

The mixing chamber has a central opening for downward liquid flow, or vapor flow, or both vapor and liquid flow. In some embodiments, there are one or more vapor chimneys extended above the collection tray around the central opening for downward vapor flow. In other embodiments, there are one or more downcomers extended below the collection tray around the central opening for downward liquid flow. The mixing chamber is in fluid communication with the bottom of the upper catalyst bed. A ring distributor injects quench fluid into a space outside the mixing chamber. The quench gas enters the mixing chamber through openings in the outer wall of the mixing chamber and is mixed with process vapor and liquid from the upper catalyst bed.

The fluid mixing occurs mostly above rough liquid distribution tray and the rough liquid distribution tray assists the vapor-liquid distribution tray for uniform fluid distribution to a lower catalyst bed.

As compared with the conventional design of HRI, the new design of the quench zone HRI shortens the space between packed beds by about 12 to 36 inches.

One aspect of the invention is a device for the mixing and distribution of fluid between catalyst beds. In one embodiment, the device comprises a collection tray comprising a central opening, the collection tray in fluid communication with a bottom of an upper catalyst bed. There is a mixing chamber above the collection tray, the mixing chamber positioned around the central opening, the mixing chamber having an outer wall located at a position inward of a reactor wall and a top plate attached to the outer wall, the outer wall having an opening to allow fluid to pass therethrough. There is a ring distributor comprising an injector for injecting quench fluid into a space above the collection tray between the reactor wall and the outer wall. There is a rough liquid distribution tray comprising a central pan in fluid communication with the central opening of the collection tray; and a vapor-liquid distribution tray in fluid communication with the rough liquid distribution tray and a top of a lower catalyst bed.

In some embodiments, the injector is directed tangential to the ring distributor.

In some embodiments, the mixing chamber further comprises an inner wall positioned around the central opening.

In some embodiments, the mixing chamber further comprises a middle wall positioned between the outer wall and the inner wall, the middle wall having opening to allow fluid to pass therethrough.

In some embodiments, the device further comprises a vapor chimney for vapor flow positioned radially outwardly of the central opening.

In some embodiments, the vapor chimney has an open bottom and is terminated at a lower surface of the collection tray.

In some embodiments, the vapor chimney extends above and below the surface of the collection tray, and wherein the vapor chimney has an upper opening above the normal operation liquid level of the collection tray and a lower opening in a lower portion of the vapor chimney.

In some embodiments, the vapor chimney extended below the collection tray has a side and a closed bottom, the lower opening being in the side adjacent to the bottom of the vapor chimney.

In some embodiments, the vapor chimney cross section is triangular.

In some embodiments, there are a plurality of vapor chimneys arrayed circumferentially around the central opening to form fluid-flow passageways therebetween.

In some embodiments, the vapor chimney has an inner wall adjacent to central opening and an outer wall spaced apart from the central opening and wherein a height of the inner wall is less than a height of the outer wall.

In some embodiments, the vapor chimney has an inner wall adjacent to central opening and an outer wall spaced apart from the central opening and a width of the inner wall is less than a width of the outer wall.

In some embodiments, the device further comprises a downcomer for liquid flow positioned radially outwardly of the central opening and the inner wall and terminated above the central pan of the rough liquid distribution tray.

In some embodiments, the rough liquid distribution tray further comprises a perforated plate in fluid communication with the central pan and extending outwardly therefrom and an end wall on the outer edge of the perforated plate, the end wall being spaced apart from a reactor wall.

In some embodiments, the device further comprises a downcomer positioned radially outwardly of the inner wall to allow liquid to pass therethrough.

In some embodiments, the rough liquid distribution tray further comprises a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the mixing pan to the end wall, the bottom of the fluid distribution troughs having openings therethrough, the end wall being spaced apart from a reactor wall.

In some embodiments, there is a space between adjacent fluid distribution troughs at the central pan, and wherein the space is closed by a plate.

In some embodiments, the width of the fluid distribution troughs at the central pan is greater than the width of the fluid distribution troughs at the end wall.

In some embodiments, the width of the fluid distribution troughs at the central pan is less than a width of the fluid distribution troughs at the end wall.

In some embodiments, the device further comprises a directional baffle at the opening in the outer wall.

In some embodiments, the device further comprising at least one of: a sensor positioned at a location to sense at least one parameter; a transmitter; or a computing device to receive data, analyze data, transmit data, or combinations thereof.

Another aspect of the invention is a device for the mixing and distribution of fluid between catalyst beds. In one embodiment, the device comprises a collection tray comprising a central opening, the collection tray in fluid communication with a bottom of an upper catalyst bed. There is a mixing chamber above the collection tray, the mixing chamber positioned around the central opening, the mixing chamber having an outer wall located at a position inward of a reactor wall and a top plate attached to the outer wall, the outer wall having an opening to allow fluid to pass therethrough. There is a ring distributor comprising an injector for injecting quench fluid into a space above the collection tray between the reactor wall and the outer wall, wherein injector is directed tangential to the ring distributor. There is a rough liquid distribution tray comprising a central pan in fluid communication with the central opening of the collection tray. There is a vapor-liquid distribution tray in fluid communication with the rough liquid distribution tray and a top of a lower catalyst bed.

In some embodiments, the device further comprises a vapor chimney for vapor flow positioned radially outwardly of the central opening. In some embodiments, it has a directional baffle at the opening in the outer wall. In some embodiments, it has a middle wall positioned between the outer wall and the inner wall, the middle wall having opening to allow fluid to pass therethrough.

Figure 2:
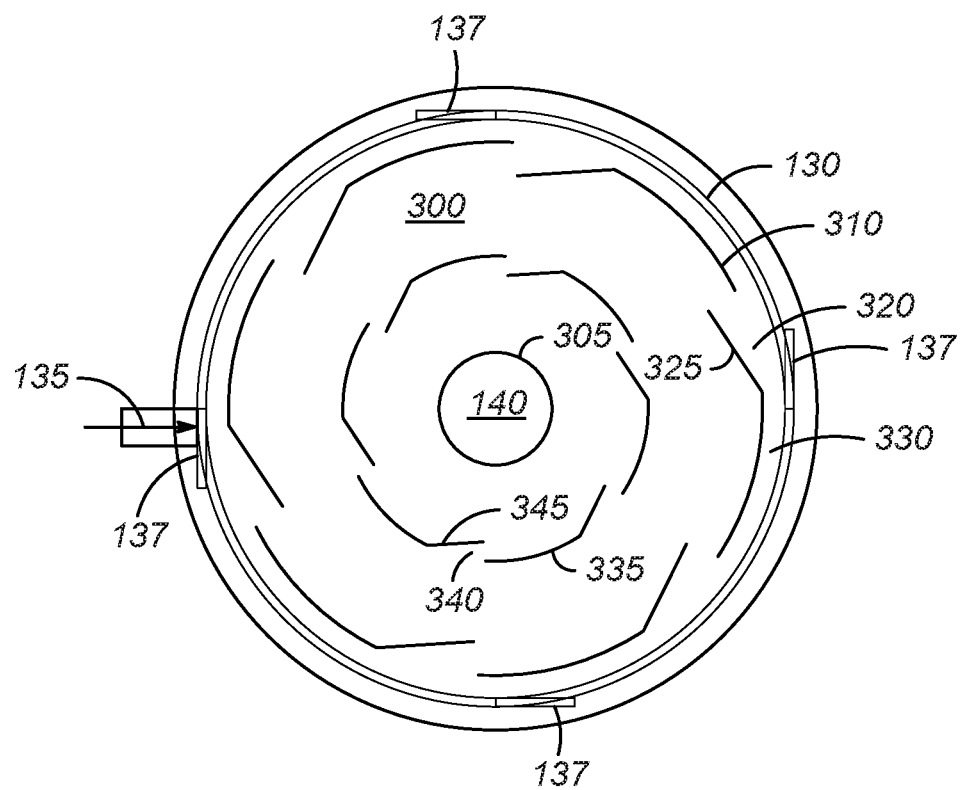
FIG. 2 is a top view of one embodiment of the collection tray, mixing chamber, and ring distributor (without the top plate) of the present invention.

As shown in FIGS. 1 and 2, the quench zone HRI 100 is between the bottom of upper catalyst bed 105 and the top of the lower catalyst bed 110. It includes the collection tray 115 with a mixing chamber 300, the rough liquid distribution tray 120, and the vapor-liquid distribution tray 125. The rough liquid distribution tray 120 comprises a central pan 150 and fluid distribution troughs 175.

In some embodiments, the mixing chamber 300 has an inner wall 305, an outer wall 310 and a top plate 315. The top plate 315 is typically situated on the top of the outer wall 310. The inner wall 305 does not extend up to the top plate 315. The outer wall 310 has openings 320 to allow fluid to pass into the mixing chamber 300. There can be directional baffles 325 extending from the outer wall 310 into the mixing chamber at the openings 320. The fluid enters the mixing chamber 300 through the openings 320 and is directed by the directional baffles 325. This arrangement eliminates the vertical space occupied by the spillways on the top plate 315 in the typical design.

The ring distributor 130 is used for injecting quench fluid 135 into the space 330 outside the mixing chamber 300. As shown in FIG. 2, the injectors 137 are directed tangential to the ring distributor 130.

The top plate 315 forces the downflow process vapor and liquid from the upper catalyst bed 105 into the space 330 where it contacts the quench fluid. The mixture enters the mixing chamber 300 through the openings 320.

In some embodiments, there is no inner wall 305 surrounding the central opening 140.

In some embodiments, there can be a middle wall 335 with openings 340 and directional baffles 345. Alternatively, there can be a clearance between top of the middle wall 335 and the top plate 315.

All fluids flow towards center of the collection tray 115 for further mixing and down through a central opening 140 in the collection tray 115, as shown in FIG. 1.

Figure 4:
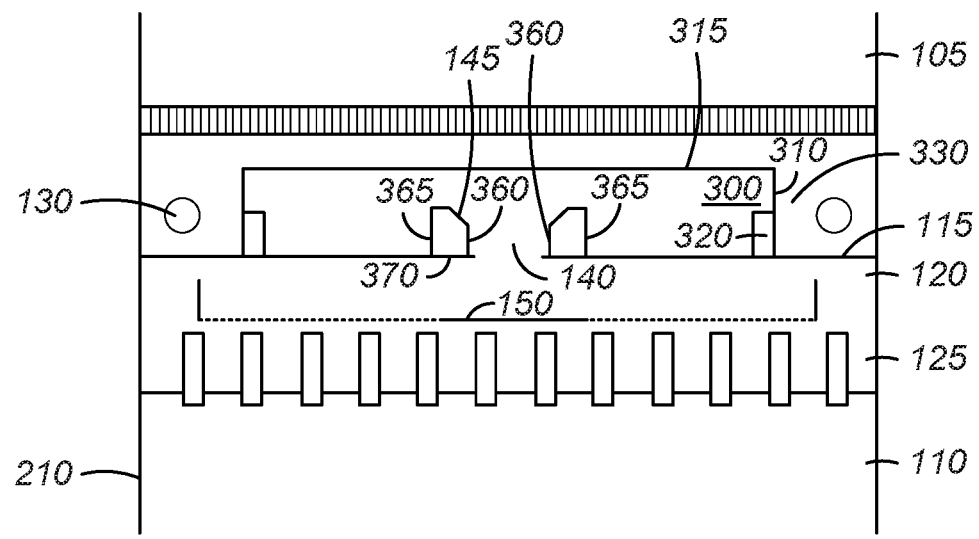
FIG. 4 is a cross section of another embodiment of the hydroprocessing reactor internals of the present invention.
Figure 5:
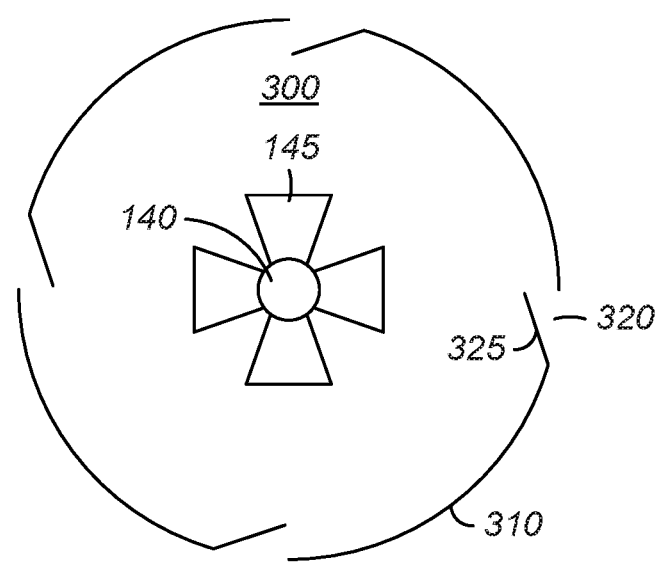
FIG. 5 is a top view of one embodiment of the mixing chamber of the present invention.

In other embodiments as shown in FIGS. 4 and 5, the vapor flows through one or more vapor chimneys 145 around the central opening 140. In this embodiment, the top of the vapor chimneys 145 is sloped toward the central opening 140 so that the height of the inner wall 360 of the vapor chimney 145 at the central opening 140 is less than the height of the outer wall 365 of the vapor chimney 145 which is farther away from the central opening 140. The vapor chimney 145 has an open bottom 370 and is terminated at a lower surface of the collection tray 115.

When the vapor chimneys 145 are present, the central opening 140 and the vapor chimneys 145 are designed such that most of the liquid flows through central opening 140, and most of the mixed gas and vapor flows through the vapor chimneys 145 on the collection tray 115.

Figure 6:
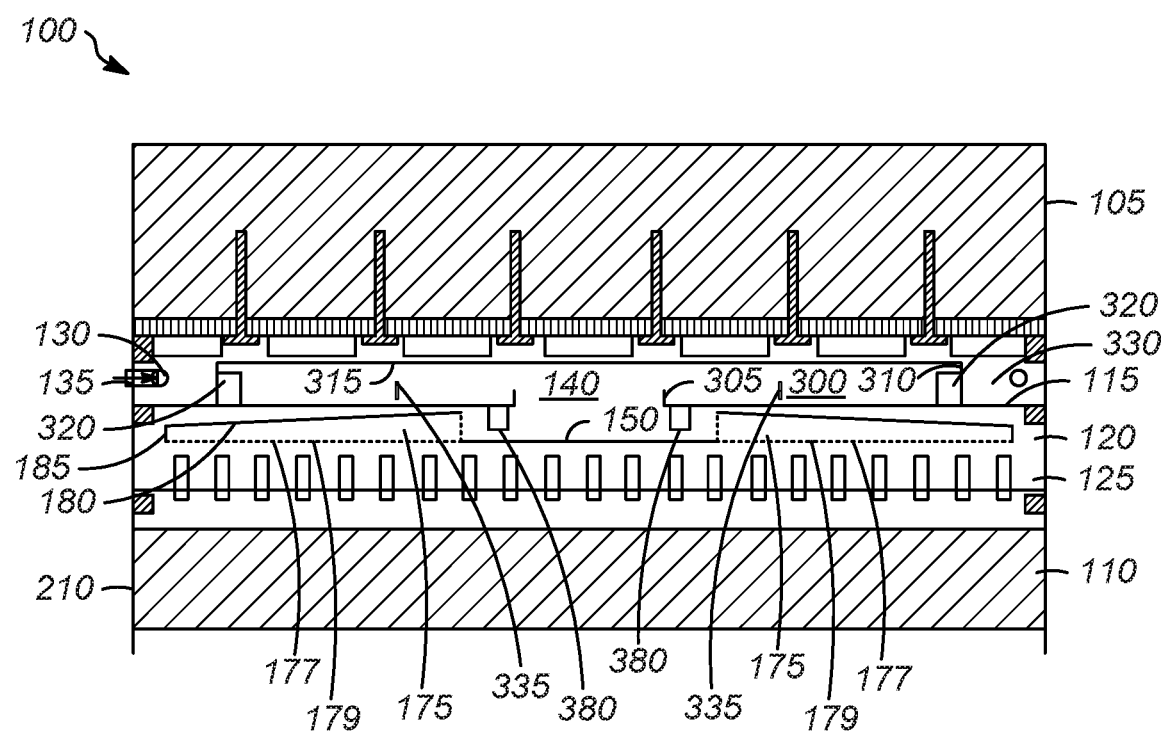
FIG. 6 is a cross section of another embodiment of the hydroprocessing reactor internals of the present invention.
Figure 7:
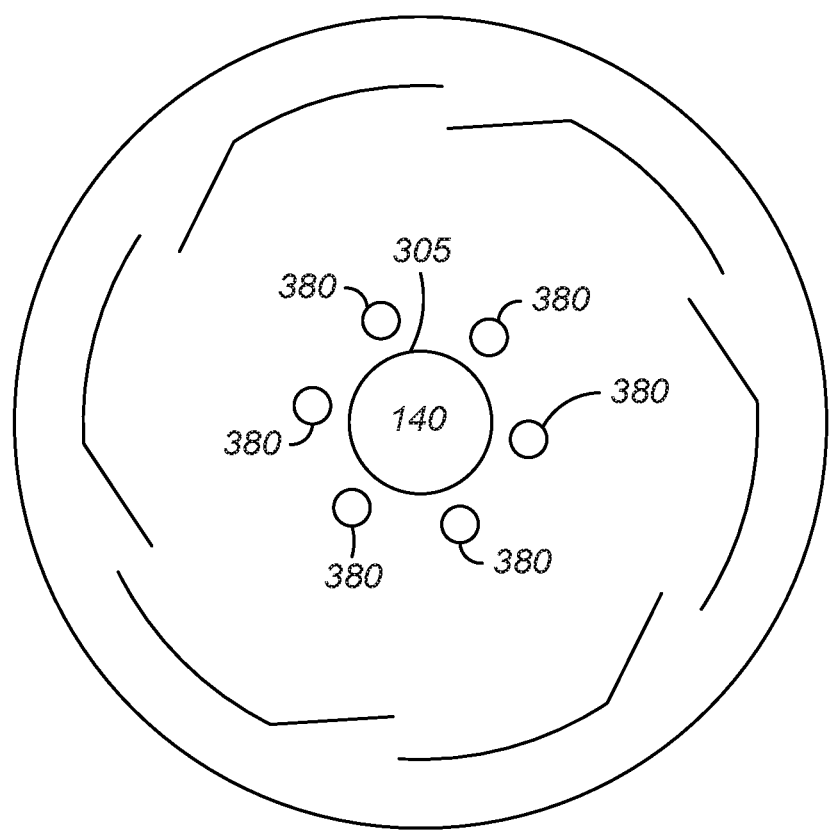
FIG. 7 is a top view of one embodiment of the collection tray and mixing chamber (without the top plate) of the present invention.

Alternatively, as shown in FIGS. 6 and 7, downcomers 380 are attached to the collection tray 115 radially outward of the inner wall 305 at the central opening 140 and extended down above the central pan 150 of the rough liquid distribution tray 120 in order to discharge liquid to the central pan 150 on the rough liquid distribution tray 120. Vapor passes down through the central opening 140 and then flows radially outward around the liquid downcomers 380.

In some embodiments (not shown), the vapor chimneys 145 can extend a couple of inches above the collection tray 115 and down close to the top surface of the central pan 150. The bottom of the vapor chimneys 145 is closed, and there are slots in the side of the vapor chimney 145 near the bottom for injecting mixed gas and vapor into the liquid in the central pan 150 to promote fluid mixing and contact.

Figure 3:
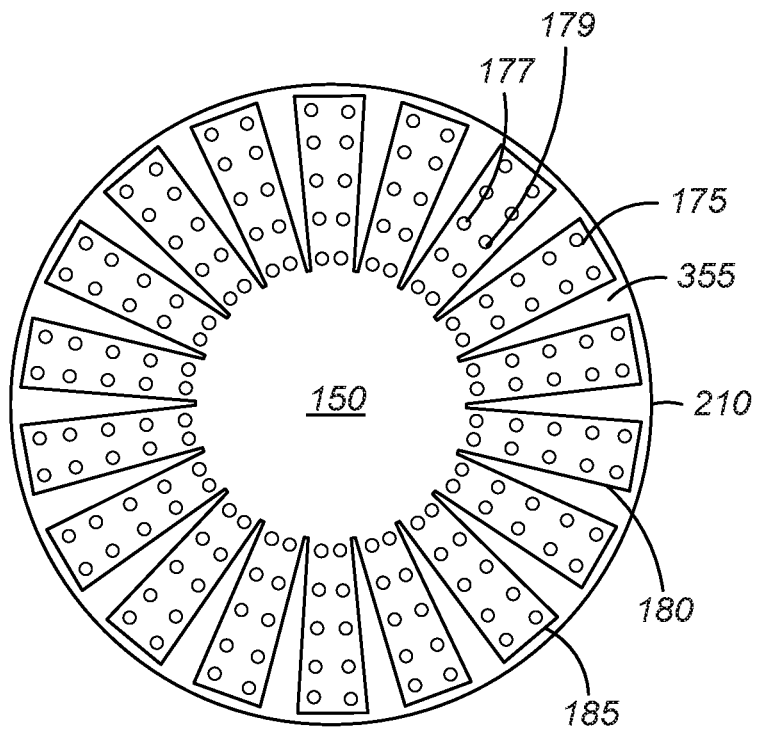
FIG. 3 is a top view of one embodiment of a rough liquid distribution tray of the present invention.

As shown in FIGS. 1 and 3, the mixed fluids then enter into the fluid distribution troughs 175 attached to the central pan 150 for distribution. Liquid flows down to the vapor-liquid distribution tray 125 through holes 177 in the perforated bottom plate 179 of the fluid distribution troughs 175, and vapor (gas) flows over the top of the side walls 180 and the end walls 185, as well as the spaces 355 between the fluid distribution troughs 175.

If there would be any gaps between adjacent fluid distribution troughs 175 on the end attached to the central pan 150, the gaps are closed with a plate so that fluids exiting the central pan 150 can only flow into the fluid distribution troughs 175 for distribution to the vapor-liquid distribution tray 125 below.

The fluid distribution troughs 175 can be any suitable size and shape. Narrow fluid distribution troughs 175 (e.g., less than 24 inches) can be designed for passing through the manway in the reactor for easy installation with minimal sealing required. The narrow fluid distribution troughs 175 are rigid and can be supported with rods attached to the decks and on the top flanges of support beams for the vapor-liquid distribution tray 125. The fluid distribution troughs 175 may be spaced a short distance (e.g., 0.25 to 0.5 inches) above the top of the beam flanges so that the holes 177 on the bottom plates 179 of the fluid distribution troughs 175 are not blocked and little splashing of liquid will be created when the liquid falls onto the top of the beam flanges. Multiple narrow fluid distribution troughs 175 also reduce the velocity of the vapor exiting from the fluid distribution troughs 175 through the clearance above the side walls 180 and end walls 185 of the fluid distribution troughs 175 so that spacing between the fluid distribution troughs 175 and the vapor-liquid distribution tray 125 is reduced without impacting the quality of fluid distribution of the vapor-liquid distribution tray 125 below.

The number, size, and shape of the troughs can be designed for accommodating various vapor and liquid flow rates. For example, the width of the fluid distribution trough 175 at the end wall 185 can be less than the width of the fluid distribution trough 175 at the central pan 150. Alternatively, the width of the fluid distribution trough 175 at the end wall 185 can be the same as or greater than the width of the fluid distribution trough 175 at the central pan 150. The number, and spacing of the fluid distribution troughs 175 and spaces 190 can vary as needed.

The fluid distribution troughs 175 are constructed with a perforated bottom plate 179, sloped side walls 180, and an end wall 185. The end of the trough attached to the central pan 150 is open so that the fluid can enter the trough. The side walls 180 are sloped from a height close to the spacing between the rough liquid distribution tray 120 and the collection tray 115 (e.g., if the net spacing between the trays is 6 inches, the side walls 180 will be about 5.75 inches) on the side attached to central pan 150 to about 1 to 3 inches at the end wall 185 close to the reactor shell 210. Typically, the height of the end wall 185 of the fluid distribution trough 175 is the same as the side walls 180 where they meet.

The description of the process and apparatus of the prior art and this invention are presented with reference to the attached Figures. The Figures are simplified diagrams of the prior art and various embodiments of the present invention and are not intended as an undue limitation on the generally broad scope of the description provided herein and the appended claims. Certain hardware such as valves, pumps, compressors, heat exchangers, instrumentation and controls, have been omitted as not essential to a clear understanding of the invention. The use and application of this hardware is well within the skill of the art.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

SPECIFIC EMBODIMENTS

While the following is described in conjunction with specific embodiments, it will be understood that this description is intended to illustrate and not limit the scope of the preceding description and the appended claims.

A first embodiment of the invention is a device for the mixing and distribution of fluid between catalyst beds comprising a collection tray comprising a central opening, the collection tray in fluid communication with a bottom of an upper catalyst bed; a mixing chamber above the collection tray, the mixing chamber positioned around the central opening, the mixing chamber having an outer wall located at a position inward of a reactor wall and a top plate attached to the outer wall, the outer wall having an opening to allow fluid to pass therethrough, a ring distributor comprising an injector for injecting quench fluid into a space above the collection tray between the reactor wall and the outer wall; a rough liquid distribution tray comprising a central pan in fluid communication with the central opening of the collection tray; and a vapor-liquid distribution tray in fluid communication with the rough liquid distribution tray and a top of a lower catalyst bed. An embodiment of the invention is one, any or all of prior embodiments in this paragraph up through the first embodiment in this paragraph wherein the injector is directed tangential to the ring distributor. An embodiment of the invention is one, any or all of prior embodiments in this paragraph up through the first embodiment in this paragraph wherein the mixing chamber further comprises an inner wall positioned around the central opening. An embodiment of the invention is one, any or all of prior embodiments in this paragraph up through the first embodiment in this paragraph wherein the mixing chamber further comprises a middle wall positioned between the outer wall and the inner wall, the middle wall having opening to allow fluid to pass therethrough. An embodiment of the invention is one, any or all of prior embodiments in this paragraph up through the first embodiment in this paragraph further comprising a downcomer positioned radially outwardly of the inner wall to allow liquid to pass therethrough. An embodiment of the invention is one, any or all of prior embodiments in this paragraph up through the first embodiment in this paragraph further comprising a vapor chimney for vapor flow positioned radially outwardly of the central opening. An embodiment of the invention is one, any or all of prior embodiments in this paragraph up through the first embodiment in this paragraph wherein the vapor chimney has an open bottom and is terminated at a lower surface of the collection tray. An embodiment of the invention is one, any or all of prior embodiments in this paragraph up through the first embodiment in this paragraph, wherein the vapor chimney extends above and below the surface of the collection tray, and wherein the vapor chimney has an upper opening above the normal operation liquid level of the collection tray and a lower opening in a lower portion of the vapor chimney. An embodiment of the invention is one, any or all of prior embodiments in this paragraph up through the first embodiment in this paragraph wherein the vapor chimney has a side and a closed bottom, the lower opening being in the side adjacent to the bottom of the vapor chimney. An embodiment of the invention is one, any or all of prior embodiments in this paragraph up through the first embodiment in this paragraph wherein the vapor chimney cross section is triangular. An embodiment of the invention is one, any or all of prior embodiments in this paragraph up through the first embodiment in this paragraph wherein there are a plurality of vapor chimneys arrayed circumferentially around the central opening to form fluid-flow passageways therebetween. An embodiment of the invention is one, any or all of prior embodiments in this paragraph up through the first embodiment in this paragraph wherein the vapor chimney has an inner wall adjacent to central opening and an outer wall spaced apart from the central opening and wherein a height of the inner wall is less than a height of the outer wall. An embodiment of the invention is one, any or all of prior embodiments in this paragraph up through the first embodiment in this paragraph wherein the vapor chimney has an inner wall adjacent to central opening and an outer wall spaced apart from the central opening and a width of the inner wall is less than a width of the outer wall. An embodiment of the invention is one, any or all of prior embodiments in this paragraph up through the first embodiment in this paragraph wherein the rough liquid distribution tray further comprises a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the mixing pan to the end wall, the bottom of the fluid distribution troughs having openings therethrough, the end wall being spaced apart from a reactor wall. An embodiment of the invention is one, any or all of prior embodiments in this paragraph up through the first embodiment in this paragraph wherein there is a space between adjacent fluid distribution troughs at the central pan, and wherein the space is closed by a plate. An embodiment of the invention is one, any or all of prior embodiments in this paragraph up through the first embodiment in this paragraph wherein a width of the fluid distribution troughs at the central pan is greater than a width of the fluid distribution troughs at the end wall. An embodiment of the invention is one, any or all of prior embodiments in this paragraph up through the first embodiment in this paragraph wherein a width of the fluid distribution troughs at the central pan is less than a width of the fluid distribution troughs at the end wall. An embodiment of the invention is one, any or all of prior embodiments in this paragraph up through the first embodiment in this paragraph, further comprising a directional baffle at the opening in the outer wall. An embodiment of the invention is one, any or all of prior embodiments in this paragraph up through the first embodiment in this paragraph, further comprising at least one of a sensor positioned at a location to sense at least one parameter; a transmitter; or a computing device to receive data, analyze data, transmit data, or combinations thereof.

A second embodiment of the invention is a device for the mixing and distribution of fluid between catalyst beds comprising a collection tray comprising a central opening, the collection tray in fluid communication with a bottom of an upper catalyst bed; a mixing chamber above the collection tray, the mixing chamber positioned around the central opening, the mixing chamber having an outer wall located at a position inward of a reactor wall and a top plate attached to the outer wall, the outer wall having an opening to allow fluid to pass therethrough; a ring distributor comprising an injector for injecting quench fluid into a space above the collection tray between the reactor wall and the outer wall, wherein injector is directed tangential to the ring distributor; a rough liquid distribution tray comprising a central pan in fluid communication with the central opening of the collection tray; and a vapor-liquid distribution tray in fluid communication with the rough liquid distribution tray and a top of a lower catalyst bed. An embodiment of the invention is one, any or all of prior embodiments in this paragraph up through the second embodiment in this paragraph further comprising a vapor chimney for vapor flow positioned radially outwardly of the central opening.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A device for the mixing and distribution of fluid between catalyst beds comprising:
   a collection tray comprising a central opening, the collection tray in fluid communication with a bottom of an upper catalyst bed;
   a mixing chamber above the collection tray, the mixing chamber positioned around the central opening, the mixing chamber having an outer wall located at a position inward of a reactor wall and a top plate attached to the outer wall, the outer wall having an opening to allow fluid to pass therethrough;
   a ring distributor comprising an injector for injecting quench fluid into a space above the collection tray between the reactor wall and the outer wall, wherein the ring distributor is positioned below the top plate of the mixing chamber;
   a rough liquid distribution tray comprising a central pan in fluid communication with the central opening of the collection tray; and
   a vapor-liquid distribution tray in fluid communication with the rough liquid distribution tray and a top of a lower catalyst bed.

2. The device of claim 1 wherein the injector is directed tangential to the ring distributor.

3. The device of claim 1 wherein the mixing chamber further comprises an inner wall positioned around the central opening.

4. The device of claim 3 wherein the mixing chamber further comprises a middle wall positioned between the outer wall and the inner wall, the middle wall having opening to allow fluid to pass therethrough.

5. The device of claim 3 further comprising a downcomer positioned radially outwardly of the inner wall to allow liquid to pass therethrough.

6. The device of claim 1 further comprising a vapor chimney for vapor flow positioned radially outwardly of the central opening.

7. The device of claim 6 wherein the vapor chimney has an open bottom and is terminated at a lower surface of the collection tray.

8. The device of claim 6, wherein the vapor chimney extends above and below the surface of the collection tray, and wherein the vapor chimney has an upper opening above the normal operation liquid level of the collection tray and a lower opening in a lower portion of the vapor chimney.

9. The device of claim 8 wherein the vapor chimney has a side and a closed bottom, the lower opening being in the side adjacent to the bottom of the vapor chimney.

10. The device of claim 6 wherein the vapor chimney cross section is triangular.

11. The device of claim 6 wherein there are a plurality of vapor chimneys arrayed circumferentially around the central opening to form fluid-flow passageways therebetween.

12. The device of claim 6 wherein the vapor chimney has an inner wall adjacent to central opening and an outer wall spaced apart from the central opening and wherein a height of the inner wall is less than a height of the outer wall.

13. The device of claim 6 wherein the vapor chimney has an inner wall adjacent to central opening and an outer wall spaced apart from the central opening and a width of the inner wall is less than a width of the outer wall.

14. The device of claim 1 wherein the rough liquid distribution tray further comprises a plurality of fluid distribution troughs in fluid communication with the central pan and extending outwardly therefrom, the fluid distribution troughs being spaced apart from one another, the fluid distribution troughs comprising a bottom, side walls, and an end wall, the side walls sloping downward from the central pan to the end wall, the bottom of the fluid distribution troughs having openings therethrough, the end wall being spaced apart from a reactor wall.

15. The device of claim 14 wherein there is a space between adjacent fluid distribution troughs at the central pan, and wherein the space is closed by a plate.

16. The device of claim 14 wherein a width of the fluid distribution troughs at the central pan is greater than a width of the fluid distribution troughs at the end wall.

17. The device of claim 14 wherein a width of the fluid distribution troughs at the central pan is less than a width of the fluid distribution troughs at the end wall.

18. The device of claim 1 further comprising a directional baffle at the opening in the outer wall.

19. A device for the mixing and distribution of fluid between catalyst beds comprising:
   a collection tray comprising a central opening, the collection tray in fluid communication with a bottom of an upper catalyst bed;
   a mixing chamber above the collection tray, the mixing chamber positioned around the central opening, the mixing chamber having an inner wall positioned around the central opening and an outer wall located at a position inward of a reactor wall and a top plate attached to the outer wall, the outer wall having an opening to allow fluid to pass therethrough;
   a downcomer positioned radially outwardly of the inner wall to allow liquid to pass therethrough;
   a ring distributor comprising an injector for injecting quench fluid into a space above the collection tray between the reactor wall and the outer wall,
   a rough liquid distribution tray comprising a central pan in fluid communication with the central opening of the collection tray; and
   a vapor-liquid distribution tray in fluid communication with the rough liquid distribution tray and a top of a lower catalyst bed.

20. A device for the mixing and distribution of fluid between catalyst beds comprising:
   a collection tray comprising a central opening, the collection tray in fluid communication with a bottom of an upper catalyst bed;
   a mixing chamber above the collection tray, the mixing chamber positioned around the central opening, the mixing chamber having an outer wall located at a position inward of a reactor wall and a top plate attached to the outer wall, the outer wall having an opening to allow fluid to pass therethrough;
   a vapor chimney for vapor flow positioned radially outwardly of the central opening;
   a ring distributor comprising an injector for injecting quench fluid into a space above the collection tray between the reactor wall and the outer wall;
   a rough liquid distribution tray comprising a central pan in fluid communication with the central opening of the collection tray; and
   a vapor-liquid distribution tray in fluid communication with the rough liquid distribution tray and a top of a lower catalyst bed.

\* \* \* \* \*